(12) United States Patent
Shipton et al.

(10) Patent No.: US 10,914,954 B2
(45) Date of Patent: Feb. 9, 2021

(54) RAINBOW REDUCTION FOR WAVEGUIDE DISPLAYS

(71) Applicant: Facebook Technologies, LLC, Menlo Park, CA (US)

(72) Inventors: Erik Shipton, Kirkland, WA (US); Giuseppe Calafiore, Redmond, WA (US); Pasi Saarikko, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 140 days.

(21) Appl. No.: 16/054,867

(22) Filed: Aug. 3, 2018

(65) Prior Publication Data

US 2020/0041791 A1 Feb. 6, 2020

(51) Int. Cl.
*G02B 27/01* (2006.01)
*G02B 5/18* (2006.01)
*G02B 27/42* (2006.01)

(52) U.S. Cl.
CPC ....... *G02B 27/0172* (2013.01); *G02B 5/1842* (2013.01); *G02B 27/4211* (2013.01); *G02B 2027/0116* (2013.01); *G02B 2027/0178* (2013.01)

(58) Field of Classification Search
CPC ............ G02B 27/0172; G02B 27/4211; G02B 5/1842; G02B 2027/0116; G02B 2027/0178
USPC .......................................................... 385/37
See application file for complete search history.

(56) References Cited

U.S. PATENT DOCUMENTS

| 4,856,869 A | 8/1989 | Sakata et al. |
| 5,982,553 A | 11/1999 | Bloom et al. |
| 6,285,813 B1 | 9/2001 | Schultz et al. |
| 7,088,441 B2 | 8/2006 | Nahum et al. |
| 8,442,374 B2 | 5/2013 | Chang-Hasnain et al. |

(Continued)

FOREIGN PATENT DOCUMENTS

| EP | 1183684 B1 | 6/2008 |
| KR | 19980050572 A | 9/1998 |

OTHER PUBLICATIONS

Extended European Search Report, European Application No. 19153308.2, dated Oct. 16, 2019, 10 pages.

(Continued)

*Primary Examiner* — Jerry M Blevins
(74) *Attorney, Agent, or Firm* — Fenwick & West LLP

(57) ABSTRACT

A multilayer grating is a diffraction grating that includes a plurality of layers. The plurality of layers arranged to form a 2-dimensional grating, the layers including at least a first patterned layer and a second patterned layer. The first patterned layer includes a plurality of different materials that are arranged in a first pattern such that the first patterned layer has a first index profile. The second patterned layer includes a plurality of different materials that are arranged in a second pattern such that the second patterned layer has a second index profile that is inverted relative to the first index profile. Ambient light incident on the first patterned layer and the second patterned layer creates a first diffracted ray and a second diffracted ray, respectively, and the first diffracted ray and the second diffracted ray destructively interfere with each other based in part on the inverted index profile.

18 Claims, 11 Drawing Sheets

(56) References Cited

U.S. PATENT DOCUMENTS

| | | |
|---|---|---|
| 9,360,615 B1 | 6/2016 | Jalava |
| 9,519,089 B1 | 12/2016 | Brown et al. |
| 2005/0211547 A1 | 9/2005 | Hanawa et al. |
| 2005/0277063 A1 | 12/2005 | Wang et al. |
| 2006/0001972 A1 | 1/2006 | Sato et al. |
| 2006/0045987 A1 | 3/2006 | Chandler et al. |
| 2007/0159673 A1 | 7/2007 | Freeman et al. |
| 2008/0193080 A1 | 8/2008 | Cheben et al. |
| 2009/0074356 A1 | 3/2009 | Sanchez et al. |
| 2009/0097122 A1 | 4/2009 | Niv |
| 2009/0224416 A1 | 9/2009 | Laakkonen et al. |
| 2009/0245730 A1 | 10/2009 | Kleemann |
| 2010/0079865 A1 | 4/2010 | Saarikko et al. |
| 2011/0038049 A1 | 2/2011 | Vallius et al. |
| 2011/0242635 A1 | 10/2011 | Oka |
| 2011/0279818 A1 | 11/2011 | Amako et al. |
| 2011/0280533 A1 | 11/2011 | Chang-Hasnain et al. |
| 2011/0317268 A1 | 12/2011 | Walter et al. |
| 2012/0062998 A1 | 3/2012 | Schultz et al. |
| 2013/0100362 A1 | 4/2013 | Saeedi et al. |
| 2013/0192758 A1 | 8/2013 | Toth et al. |
| 2014/0085725 A1* | 3/2014 | Lochbihler ............ G02B 5/204 359/568 |
| 2015/0125976 A1 | 5/2015 | Wang |
| 2015/0253570 A1* | 9/2015 | Sunnari ................ G02B 5/1809 359/576 |
| 2015/0279686 A1 | 10/2015 | Kuo et al. |
| 2016/0018639 A1 | 1/2016 | Spitzer et al. |
| 2016/0033784 A1 | 2/2016 | Levola et al. |
| 2016/0035539 A1 | 2/2016 | Sainiemi et al. |
| 2016/0042971 A1 | 2/2016 | Mohanty |
| 2016/0231567 A1 | 8/2016 | Saarikko et al. |
| 2016/0301188 A1 | 10/2016 | Mathai et al. |
| 2016/0357016 A1 | 12/2016 | Cakmakci et al. |
| 2017/0010465 A1 | 1/2017 | Martinez et al. |
| 2017/0059879 A1 | 3/2017 | Vallius |
| 2017/0236463 A1 | 8/2017 | Chi et al. |
| 2017/0311430 A1 | 10/2017 | Liang et al. |
| 2017/0315356 A1 | 11/2017 | Tervo |
| 2017/0357101 A1 | 12/2017 | Tervo et al. |
| 2018/0081176 A1 | 3/2018 | Olkkonen et al. |

OTHER PUBLICATIONS

Miller et al., "Design and Fabrication of Binary Slanted Surface-Relief Gratings for a Planar Optical Interconnection," Applied Optics, Aug. 10, 1997, vol. 36, No. 23, pp. 1-12.
PCT International Search Report and Written Opinion, PCT Application No. PCT/US2018/036515, dated Sep. 27, 2018, 13 pages.
United States Office Action, U.S. Appl. No. 16/209,719, dated Nov. 8, 2019, 10 pages.
United States Office Action, U.S. Appl. No. 15/878,287, dated Oct. 17, 2019, 19 pages.
PCT International Search Report and Written Opinion, PCT Application No. PCT/US2018/058272, dated Mar. 11, 2019, 14 pages.
PCT International Search Report and Written Opinion, PCT Application No. PCT/US2019/014075, dated May 8, 2019, 11 pages.
PCT International Search Report and Written Opinion, PCT Application No. PCT/US2019/045094, dated Oct. 30, 2019, 10 pages.
United States Office Action, U.S. Appl. No. 15/878,287, dated Apr. 28, 2020, eight pages.

* cited by examiner

RAINBOW REDUCTION FOR WAVEGUIDE DISPLAYS

BACKGROUND

The disclosure relates generally to near-eye-display systems, and more specifically to rainbow reduction in waveguide displays.

Near-eye displays project images directly into a user's eye. One problem with conventional near-eye displays, in particular those using diffractive optics, is stray light (i.e., a portion of ambient light that is outside a field of view of the user) incoupling into a field of view of the user. The stray light may have originated outside a field of view of a user, however, the diffractive optics can act to scatter and/or diffract the stray light into the field of view of the user. This can present to the user as a rainbow and is referred to as the "rainbow effect." The rainbow effect can be detrimental to an augmented and/or mixed reality experience.

SUMMARY

A multilayer grating is a diffraction grating for rainbow reduction. The multilayer grating includes a plurality of layers arranged to form a 2-dimensional grating. The plurality of layers includes at least a first patterned layer and a second patterned layer. The first patterned layer includes a plurality of different materials that are arranged in a first pattern such that the first patterned layer has a first index profile. The second patterned layer includes a plurality of different materials that are arranged in a second pattern such that the second patterned layer has a second index profile that is inverted relative to the first index profile. Ambient light incident on the first patterned layer and the second patterned layer creates a first diffracted ray and a second diffracted ray (e.g., a first order ray), respectively, and the first diffracted ray and the second diffracted ray destructively interfere with each other based in part on the inverted index profile, thereby reducing the rainbow effect.

The multilayer grating may be coupled to a waveguide. The waveguide includes a waveguide body, an input grating, and the multilayer grating. The waveguide body expands received image light in at least one dimension as light propagates within the waveguide body. The input grating is configured to incouple image light into the waveguide body. The multilayer grating is configured to output a first portion of the expanded image light to an eyebox, ambient light incident on the first patterned layer and the second patterned layer creates, respectively, a first diffracted ray and a second diffracted ray. The first diffracted ray and the second diffracted ray destructively interfere with each other based in part on the inverted index profile. The destructive interference acts to mitigate the rainbow effect.

In some embodiments, the waveguide may be part of a near-eye display (NED). The NED is used for presenting media to a user. The NED may be part of an artificial reality system. The NED includes a light source assembly and the waveguide. The light source assembly is configured to emit an image light that is at least partially coherent.

Figure 1:
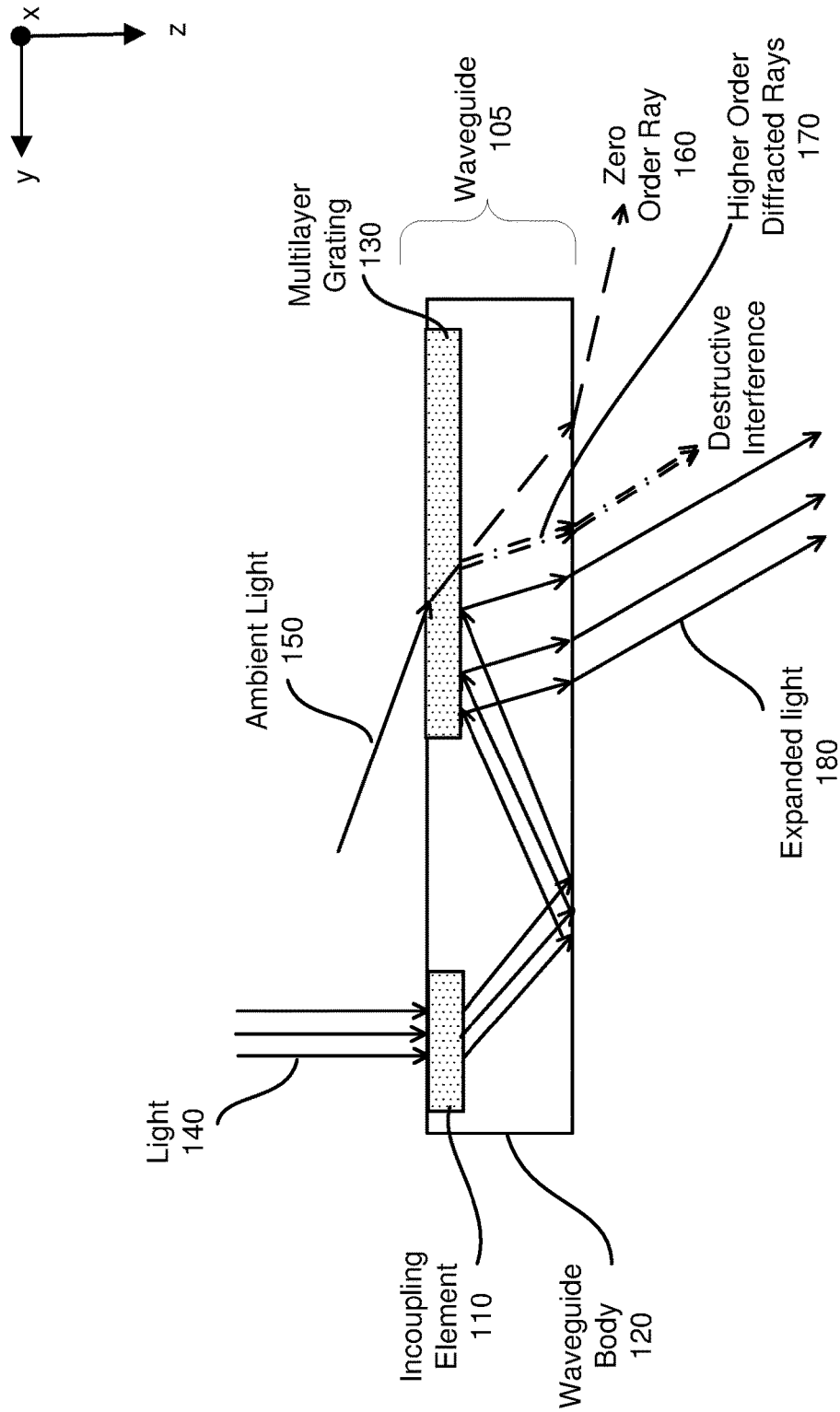
FIG. 1 illustrates a cross-section of a waveguide, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

A multilayer grating is a diffraction grating for rainbow reduction. The multilayer grating includes a plurality of patterned layers arranged to form a 2-dimensional diffraction grating. Each patterned layer is translationally symmetric with adjacent patterned layers and has a pattern that is offset from the adjacent patterned layers by half a pattern period in at least one dimension. Accordingly, each patterned layer has an index profile that is identical to, but inverted relative to the index profiles of adjacent patterned layers. This relationship in adjacent index profiles allows for one or more non-zero diffraction orders produced by different patterned layers to destructively interfere with each other, thereby mitigating the rainbow effect. Moreover, as the relationship between adjacent index profiles may occur in more than one dimension, the multilayer grating is able to mitigate the rainbow effect in multiple dimensions.

In some embodiments, the multilayer grating is part of a waveguide. And in some embodiments, the waveguide may be part of a near-eye display (NED). The NED is used for presenting media to a user. The NED may be part of an artificial reality system. The NED includes a light source assembly and the waveguide. The light source assembly is configured to emit an image light that is at least partially coherent.

FIG. 1 illustrates a cross-section 100 of a waveguide 105, in accordance with one or more embodiments. In some embodiments, the waveguide 105 is a component of a near-eye display (e.g., as part of an output waveguide of a display) as discussed below with regard to FIGS. 9 and 10. In alternate embodiments, the waveguide 105 is part of some other NED, or other system that directs display image light to a particular location. The waveguide 105 includes an incoupling element 110, a waveguide body 120, and a multilayer grating 130.

The incoupling element 110 incouples light 140 into the waveguide body 120. The incoupling element 110 may be, e.g., a diffraction grating, a holographic grating, one or more cascaded reflectors, one or more prismatic surface elements, an array of holographic reflectors, a multilayer grating (similar to the multilayer grating 130), and some combination thereof. For example, in embodiments where the incoupling element 110 is a type of diffraction grating, the pitch of the diffraction grating is chosen such that total internal reflection occurs, and the image light 140 propagates internally within the waveguide body 120. For example, the pitch of the diffraction grating may be in the range of 300 nm to 600 nm.

The waveguide body 120 expands internally reflected light in at least one dimension. For example, as illustrated in FIG. 1, the waveguide body 120 may expand the light 140 in they and/or x dimension. The waveguide body 120 may be composed of one or more materials that facilitate total internal reflection of the light 140. The waveguide body 120 may be composed of e.g., silicon, plastic, glass, or polymers, or some combination thereof. In some embodiments, the waveguide body 120 has a relatively small form factor. For example, the waveguide body 120 may be approximately 50 mm wide along x-dimension, 30 mm long along y-dimension and 0.5-1 mm thick along Z-dimension.

The multilayer grating 130 decouples some of the light 140 from the waveguide body 120. The multilayer grating 130 may be a 1 dimensional grating (e.g., diffracts light along one dimension) or a 2-dimensional grating (e.g., diffracts light in two dimensions). The multilayer grating 130 comprises a plurality of layers (not shown). The plurality of layers include a plurality of patterned layers, and may optionally include one or more spacer layers. The patterned layers are discussed in detail below with regard to FIGS. 1-4, and the spacer layers are discussed in detail below with regard to FIG. 5. Each of the patterned layers is formed of materials arranged in a periodic pattern, and each pattern of each patterned layer has translational symmetry along one or more grating directions (e.g., in y and/or x) with respect to adjacent patterned layers. Moreover, each patterned layer is positioned ½ period out of alignment with the adjacent patterned layers, thereby forming an "inverted" index profile that is an inverse of the index profile of each of the adjacent patterned layers.

An ambient ray of light 150 may incouple to the waveguide body 120, resulting in, e.g., a first order ray 160 and a zero order ray 170. The zero order ray 170 just propagates through the waveguide 100. At each patterned layer, additional diffraction orders are produced.

As discussed in detail below with regard to FIGS. 2-5, the plurality of patterned layers in the multilayer grating 130 act to mitigate unwanted diffraction orders (i.e., the rainbow effect). For example, as illustrated in FIG. 1, ambient light 150 is diffracted by the multilayer grating 100 to form a zero order ray 160 and higher order rays 170. But due to the inverted index profiles discussed above, the higher order rays 170 destructively interfere with each other and accordingly mitigate the rainbow effect.

A pitch of the multilayer grating 130 is chosen to cause portions of incident light 140 to exit the waveguide body 120 as expanded light 180. An orientation and position of the expanded light 180 exiting from the waveguide 100 is controlled by changing an orientation and position of the light 140 entering the incoupling element 110. For example, the pitch of the multilayer grating 130 may be in the range of 300 nm to 600 nm.

Figure 2:
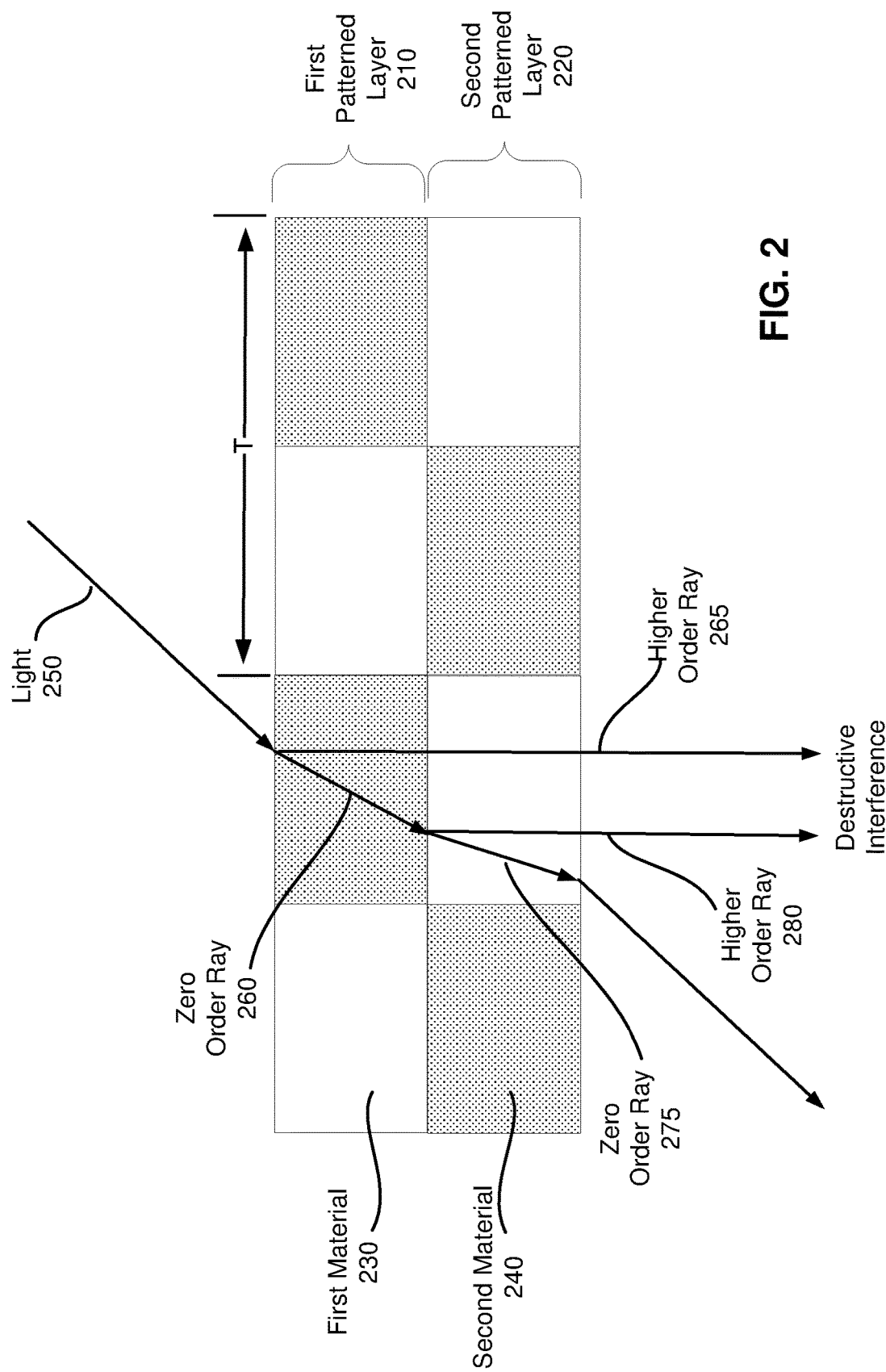
FIG. 2 illustrates a cross section of a portion of a multilayer grating, in accordance with one or more embodiments.

FIG. 2 illustrates a cross section 200 of a portion of a multilayer grating, in accordance with one or more embodiments. The multilayer grating may be an embodiment of the multilayer grating 130. The multilayer grating comprises a first patterned layer 210 and a second patterned layer 220.

The first patterned layer 210 is composed of a first material 230 and a second material 240. The first material 230 and the second material 240 are arranged in a first periodic pattern that has a period T, such that the first patterned layer 210 has a first index profile. A single instance of the first material 230 or the second material 240 is referred to as a section of a patterned layer. The second patterned layer 220 is also composed of the first material 230 and the second material 240, and the materials are arranged in a second periodic pattern that has the period T, but the second periodic pattern is offset by ½ a period relative to the first periodic pattern of the first patterned layer 210. In alternate embodiments, the second patterned layer 220 may be composed of some other materials that have the same index profile as the first material 230 and the second material 240. Accordingly, the second patterned layer 220 has an index profile that is identical, but inverted relative to the first index profile. This relationship in adjacent index profiles allows for one or more non-zero diffraction orders (e.g., −1 order) produced by the first patterned layer 210 and also produced by the second patterned layer 220 to destructively interfere with each other, thereby mitigating the rainbow effect.

For example, light 250 is incident on the first patterned layer 210, the light 250 diffracts into a plurality of rays each corresponding to different diffraction orders, including a zero order ray 260 and a higher order ray 265. The higher order ray 265 may be, e.g., a ray corresponding to a −1 diffractive order. The higher order ray 265 has a phase ($\phi_1$) that is based in part on the first periodic pattern.

The zero order ray 260 propagates through the first patterned layer 210, and is diffracted again at the second patterned layer 220. The zero order ray 260 is diffracted into a plurality of rays each corresponding to different diffraction orders, the plurality of rays including a zero order ray 275 and a higher order ray 280. The higher order ray 280 is the same diffraction order (e.g., −1) as the higher order ray 265. The higher order ray 280 has a phase ($\phi_2$) that is based in part on the second periodic pattern. And because the second periodic pattern is translationally symmetric with the first periodic pattern and is offset by T/2 relative to the first periodic pattern, a phase difference between the phase ($\phi_2$) the phase ($\phi_1$) is 180 degrees, and causes the higher order ray 265 and the higher order ray 280 to destructively interfere with each other. The destructive interference of higher order rays produced by diffraction at each of the individual layers mitigates rainbow effect that would otherwise occur in conventional single layer gratings.

Also note that, in FIG. 2, a single higher order ray (i.e., 265 and 285) is produced at each layer, but it should be understood that rays of other diffraction orders are also produced at each layer. And in a manner similar to that described above for the higher order rays 265 and 280, these other rays destructively interfere with one another. Moreover, in practice, many of these other rays can be neglected as they carry negligible power and would likely not be visible to a user.

Note that in other embodiments, the multilayer grating comprises layers in addition to the first patterned layer 210 and the second patterned layer 220. The additional layers may include patterned layers or spacer layers. A patterned layer is a layer that is made up of different materials that are arranged in a periodic pattern. For example, in FIG. 2, the first patterned layer 210 and the second patterned layer 220 are both patterned layers. Each additional layer has the same periodic pattern as adjacent layers, but offset by T/2 from the adjacent layers. Additional embodiments relating to multilayer gratings are discussed below with regard to FIGS. 3A-5. A spacer layer is a layer that does not include the same periodic pattern as the patterned layers and instead performs an optical function (e.g., an optical filter). Spacer layers are further discussed below with regard to FIG. 5.

Figure 3A:
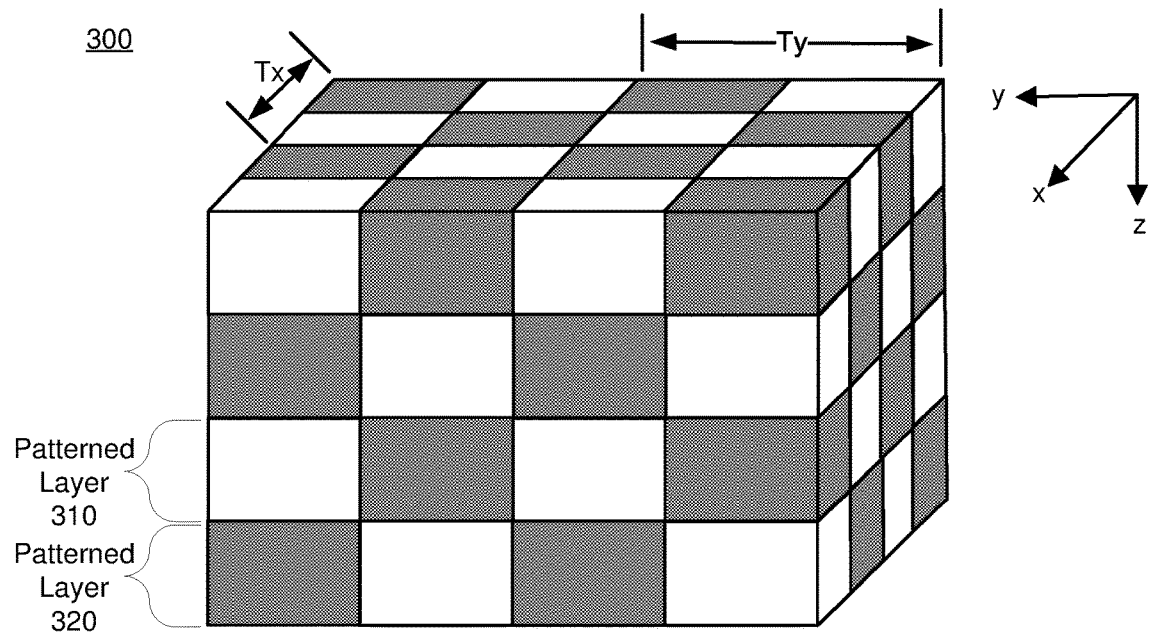
FIG. 3A illustrates a portion of a multilayer grating that has a 2-dimensional pattern, in accordance with one or more embodiments.

FIG. 3A illustrates a portion of a multilayer grating 300 that has a 2-dimensional pattern, in accordance with one or more embodiments. The multilayer grating 300 may be an embodiment of the multilayer grating 130. The multilayer grating 300 is composed of a plurality of patterned layers arranged to form a portion of a 2-dimensional grating. While FIG. 3A shows 4 patterned layers (each patterned layer occupies a different position along the z-dimension), in other embodiments, the multilayer grating 300 includes fewer or additional patterned layers.

Each patterned layer is of a periodic pattern that is periodic along the x dimension (Tx) and periodic along the y dimension (Ty). Moreover, each patterned layer is translationally symmetric with adjacent patterned layers and is offset from the adjacent patterned layers by Tx/2 along the x dimension and Ty/2 along the y dimension. For example, in FIG. 3, a patterned layer 310 has a periodic pattern similar to the periodic pattern in FIG. 2, except that in addition to being periodic along the y dimension it is also periodic in the x dimension. And the patterned layer 310 is adjacent to a patterned layer 320. The patterned layer 320 has the same periodic pattern of the patterned layer 310, it is just offset by Tx/2 in the x dimension and Ty/2 in the y dimension. Accordingly, there is a relationship between index profiles of adjacent patterned layers. Each patterned layer has an index profile (in x and y) that is identical to, but inverted relative to the index profiles of adjacent patterned layers. This relationship in adjacent index profiles allows for one or more non-zero diffraction orders produced by different patterned layers to destructively interfere with each other, thereby mitigating the rainbow effect. Moreover, as the relationship between adjacent index profiles occurs in both the x dimension and the y dimension, the multilayer grating 300 is able to mitigate the rainbow effect in both x and y.

Figure 3B:
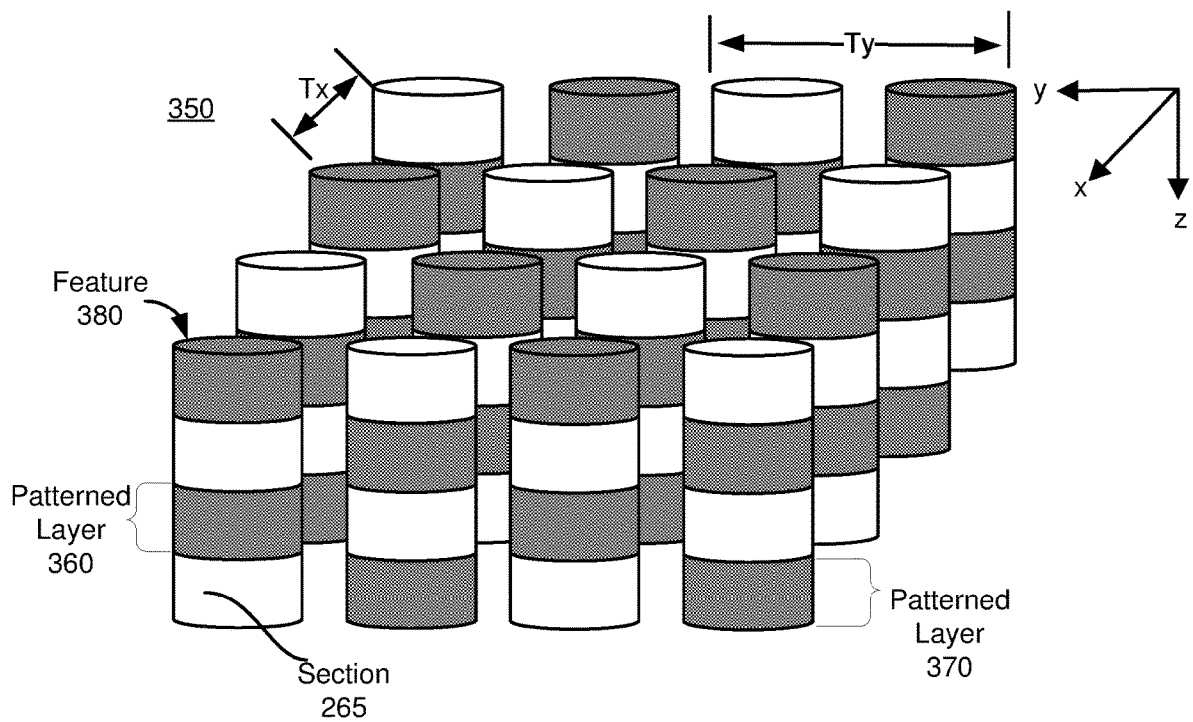
FIG. 3B illustrates a portion of a multilayer grating that has a 2-dimensional pattern in a column configuration, in accordance with one or more embodiments.

FIG. 3B illustrates a portion of a multilayer grating 350 that has a 2-dimensional pattern in a column configuration, in accordance with one or more embodiments. The multilayer grating 350 may be an embodiment of the multilayer grating 130. The multilayer grating 350 is composed of a plurality of patterned layers arranged to form a portion of a 2-dimensional grating. While FIG. 3B shows 4 patterned layers (each patterned layer occupies a different position along the z-dimension), in other embodiments, the multilayer grating 350 includes fewer or additional patterned layers.

Each of the patterned layers are composed of sections of individual features. As illustrated in FIG. 3B, a feature is an entire column of sections (e.g., 4 sections). Note that while the cross section of a feature in x-y is circular as illustrated, in other embodiments, the cross section of a feature in x-y may have some other shapes (e.g., hexagonal, rectangular, etc.).

Similar to FIG. 3A, each patterned layer is of a periodic pattern that is periodic along the x dimension (Tx) and periodic along the y dimension (Ty). Moreover, each patterned layer is translationally symmetric with adjacent patterned layers and is offset from the adjacent patterned layers by Tx/2 along the x dimension and Ty/2 along the y dimension. For example, in FIG. 3, a patterned layer 310 has a periodic pattern similar to the periodic pattern in FIG. 2, except that in addition to being periodic along the y dimension, it is also periodic in the x dimension. And the patterned layer 310 is adjacent to a patterned layer 320. The patterned layer 320 has the same periodic pattern of the patterned layer 310, it is just offset by Tx/2 in the x dimension and Ty/2 in the y dimension. Accordingly, there is a relationship between index profiles of adjacent patterned layers. Each patterned layer has an index profile (in x and y) that is identical to, but inverted relative to the index profiles of adjacent patterned layers. This relationship in adjacent index profiles allows for one or more non-zero diffraction orders produced by different patterned layers to destructively interfere with each other, thereby mitigating the rainbow effect. Moreover, as the relationship between adjacent index profiles occurs in both the x dimension and the y dimension, the multilayer grating 300 is able to mitigate the rainbow effect in both x and y.

Figure 4:
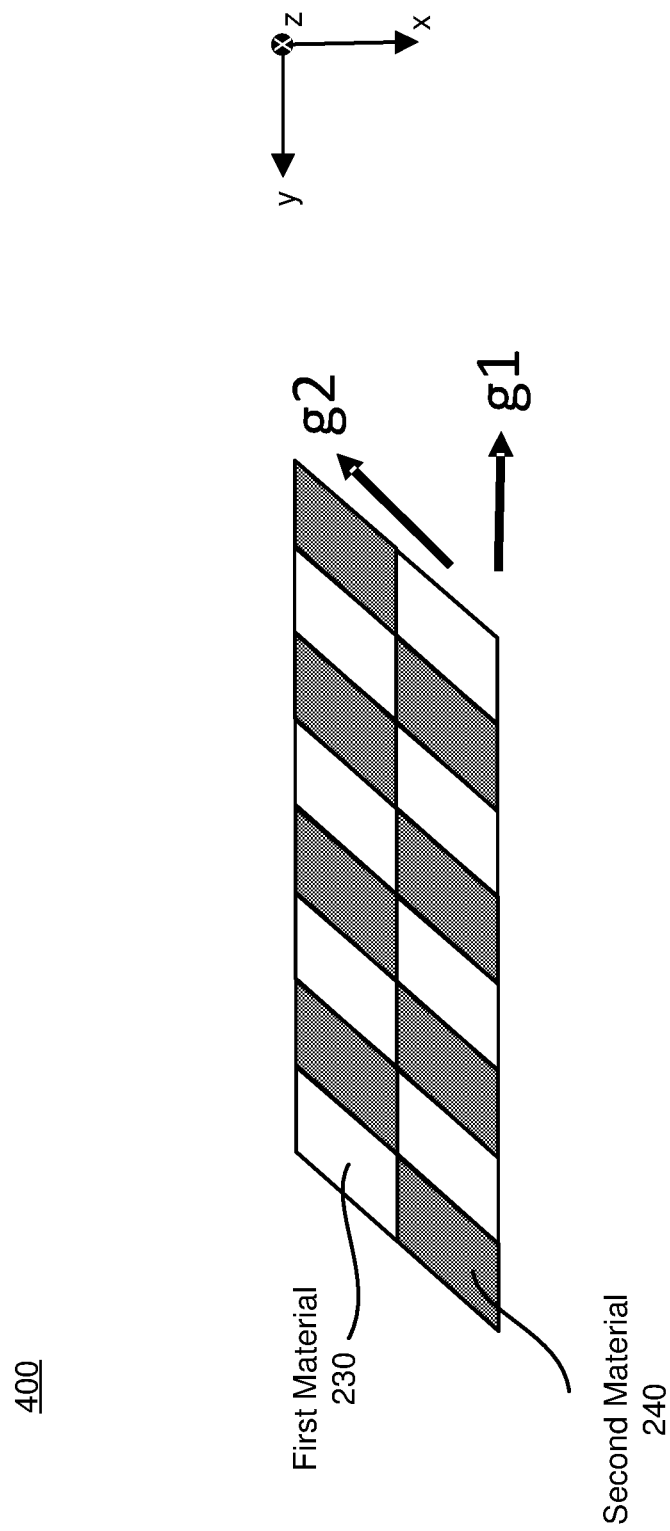
FIG. 4 illustrates a top view of a portion of a multilayer grating that has a 2-dimensional pattern and non-orthogonal grating vectors, in accordance with one or more embodiments.

FIG. 4 illustrates a top view (in x-y plane) of a portion of a multilayer grating 400 that has a 2-dimensional pattern and non-orthogonal grating vectors, in accordance with one or more embodiments. A grating vector expresses a direction and spacing of grating planes (e.g., planes that perpendicular to the surface of the grating) and the relation between propagation vectors associated with light incident and diffracted from the multilayer grating. The multilayer grating 400 may have a plurality of layers, similar to what is shown above in FIG. 3A. The layers would occupy different positions below the layer shown in FIG. 4 (e.g., placed at different locations along the z-dimension. Each layer has alternating placement of sections of first material 230 and sections of the second material 240 similar to what is shown in FIG. 3A. However, the geometry of each placed section is not rectangular and is instead a parallelogram, resulting in non-orthogonal grating vectors, g1 and g2.

Figure 5:
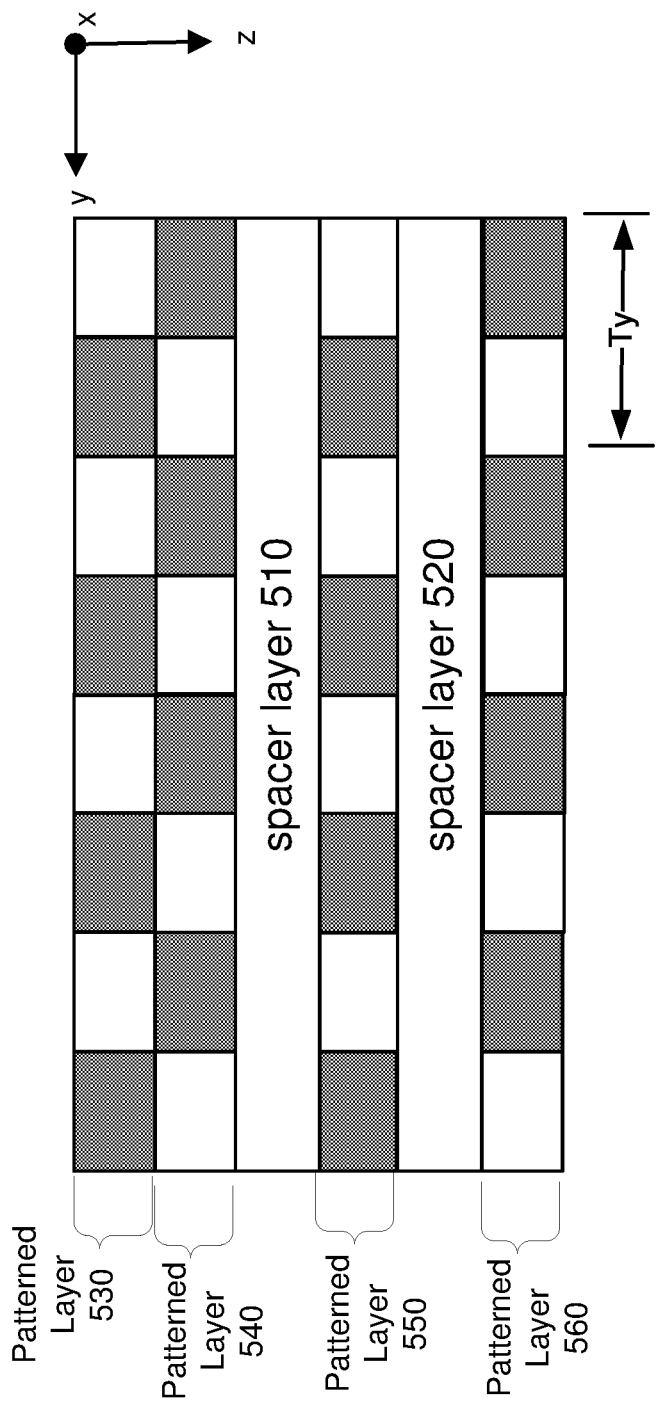
FIG. 5 illustrates a side view of a portion of a multilayer grating that has a 2-dimensional pattern and a plurality of spacer layers, in accordance with one or more embodiments.

FIG. 5 illustrates a side view of a portion of a multilayer grating 500 that has a 2-dimensional pattern and a plurality of spacer layers, in accordance with one or more embodiments. The multilayer grating 500 is substantially similar to what is shown above in FIG. 3A except that it includes two spacer layers. For example, in FIG. 5, the multilayer grating 500 includes a spacer layer 510 and a spacer layer 520, and patterned layers 530, 540, 550, and 560. A spacer layer is a layer that does not include a periodic pattern like the patterned layers and instead performs an optical function. An optical function may be, e.g., filtering, reflecting, polarizing, attenuating, etc. A spacer layer may be, e.g., a neutral density filter, a notch filter, some other filter, a partially reflective layer, a polarizer, some other layer that performs an optical function, or some combination thereof. Note that the multilayer grating 500 includes the plurality of patterned layers 530, 540, 550, and 560, and that each patterned layer has a same periodic pattern as an adjacent patterned layer (above and/or below), it is just offset by Ty/2 in the y dimension (and while not shown—also Tx/2 in the x dimension). Accordingly, there is a relationship between index profiles of adjacent patterned layers. Each patterned layer has an index profile (in x and y) that is identical to, but inverted relative to the index profiles of adjacent patterned layers. This relationship in adjacent index profiles allows for one or more non-zero diffraction orders produced by different patterned layers to destructively interfere with each other, thereby mitigating the rainbow effect. Moreover as the relationship between adjacent index profiles occurs in both the x dimension and the y dimension, the multilayer grating 500 is able to mitigate the rainbow effect in both x and y in addition to performing the optical functions of the spacer layers (e.g., 510 and 520). While FIG. 5 shows two spacer layers and four patterned layers, in other embodiments not shown, the multilayer grating 500 may include more or less spacer layers and more or less patterned layers than what is shown in FIG. 5.

Figure 6:
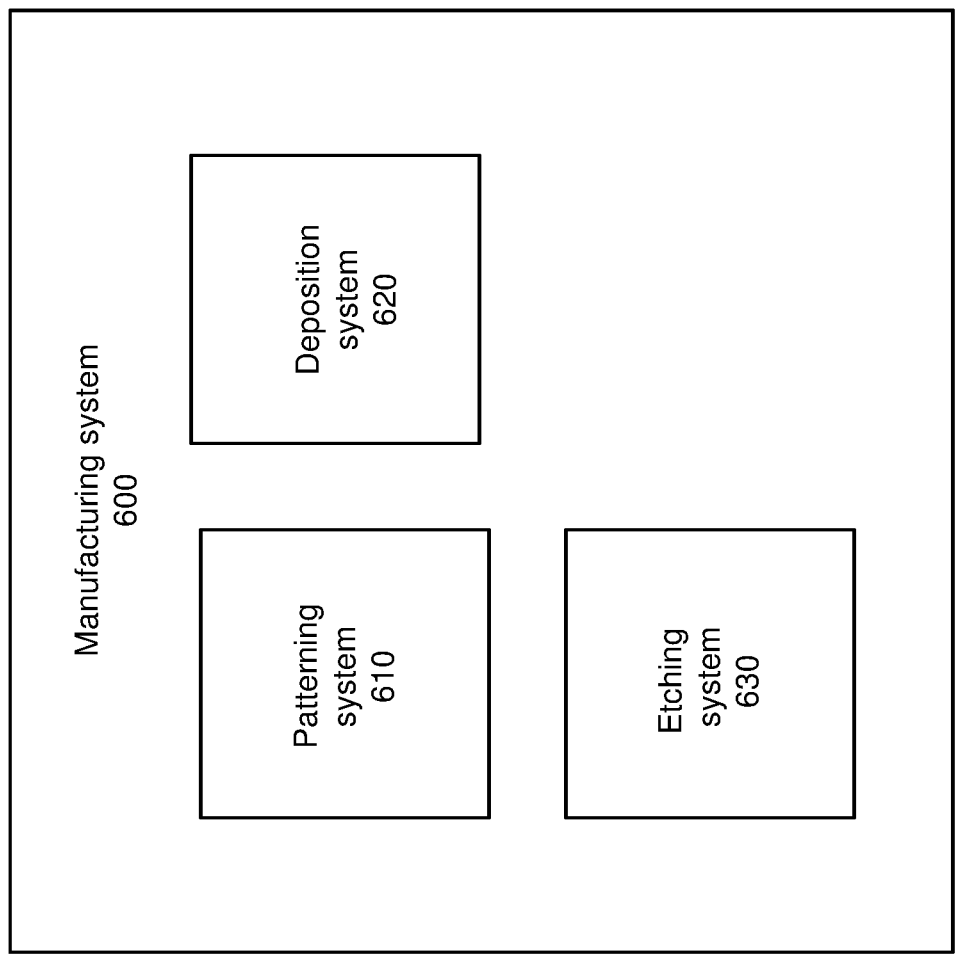
FIG. 6 is a block diagram of a manufacturing system for fabricating a multilayer grating, in accordance with one or more embodiments.

FIG. 6 is a block diagram of a manufacturing system 600 for fabricating a multilayer grating, in accordance with one embodiment. The manufacturing system 600 is a set of systems that produces a multilayer grating with a plurality of patterned layers, and in some embodiments, produces a multilayer grating with one or more spacer layers formed in between the plurality of patterned layers. The manufacturing system 600 may fabricate any one of the multilayer gratings discussed above (e.g., with ref to FIGS. 3A-5). The manufacturing system 600 includes a patterning system 610, a deposition system 620, an etching system 630, or some combination thereof. The manufacturing system 600 may be similar to a system of fabricating devices used to form an integrated circuit, and may include such components as an etching component, a thin film manufacturing component, an oxidation component, and so on. In some embodiments, the manufacturing system 600 includes a controller (not shown here) that controls each system in the manufacturing system 600.

The patterning system 610 is a system that performs a patterning of a substance formed on a substrate creating a change in geometry of the substance. In some embodiments, the patterning system 610 includes a convection oven, a hot plate, a cool plate, an infrared lamp, a wafer spinner, a mask aligner, an exposure system, a wet bench based developer system, or some combination thereof. In one example, the patterning system 610 includes a pair of convection ovens for processing batches of wafers through hard and soft baking for dehydration purposes at a temperature in the range of 150-200° C., a programmable wafer spinner, a contact-type mask aligner, and an exposure system with a mercury source of intensity close to 25 mW/cm$^2$.

In another embodiment, the patterning system 610 includes equipment performing at least one of: an electron beam lithography, an interference lithography, a multi-photon lithography, a scanning probe lithography, or some combination thereof. In a first example, the patterning system 610 is based on electron beam lithography in which a focused beam of electrons performs a scanning of a desired shape on a surface covered with an electron-sensitive film. The focused electron beam changes the solubility of the electron-sensitive film resulting in a selective removal of either the exposed or unexposed regions of the electron-sensitive film by immersing in a solvent. In a second example, the patterning system 610 is based on interference lithography in which an interference pattern consisting of a periodic series of fringes representing intensity minima and maxima between two or more coherent light waves is set up and recorded in a light sensitive material. In some configurations, the patterning system 610 includes one or more devices performing two-beam interference lithography, a three-beam interference lithography, a four-beam interference lithography, a multi-wave interference lithography, or some combination thereof. Accordingly, the patterning system 610 may perform a lithographic patterning of an array of patterns with a hexagonal symmetry, a rectangular symmetry, an aperiodic pattern with a defined spatial frequency spectrum, or some combination thereof. In a third example, the patterning system 610 is based on multi-photon lithography in which a negative-tone or positive-tone photoresists is illuminated with light from a laser of well-defined wavelength without the use of any complex optical systems. The multi-photon lithography process is based on a multi-photon absorption process in a light-sensitive material that is transparent at the wavelength of the laser for creating the lithographic pattern. By scanning and properly modulating the laser, a chemical change occurs at the focal spot of the laser and can be controlled to create an arbitrary three-dimensional periodic or non-periodic pattern. In a fourth example, the patterning system 610 is based on scanning probe lithography in which a scanning probe microscope is used for directly writing the desired lithographic pattern on a light-sensitive material using heat, chemical reaction, diffusion, oxidation, electrical bias, mechanical force, or some combination thereof. In some configurations, the patterning system 610 includes one or more devices performing lithographic patterning on a photo-sensitive material at different locations simultaneously using different types of scanning probe microscope in a parallel fashion for high volume manufacturing.

In alternate embodiments, the patterning system 610 includes an imprinting system that performs a mechanical stamping of a pattern on a substrate. In one example, the imprinting system performs a transfer of a pattern onto the substrate based on a removal of a residual polymeric layer and a subsequent removal of features imprinted into the patterned substrate. The patterning system 610 includes a thermal imprinting system, an ultraviolet imprinting system, a jet and flash imprinting system, a reverse imprinting system, or some combination thereof. The thermal imprinting system is a system that applies a mechanical force on a pre-heated stamp against a thermoplastic polymer that was previously spin-coated on the substrate. The ultraviolet imprinting system is a system that applies an ultraviolet radiation on a low-viscosity, UV-curable polymer (e.g. PDMS, HSQ) to cross-link the polymer followed by releasing the mold from the substrate. The jet and flash imprinting system is a system that dispenses the polymer on the substrate through one or more ink jets at a low pressure and temperature compared to the thermal imprinting system and the ultraviolet imprinting system. The reverse imprinting system is a system that coats a polymer directly onto a template and releases the patterned substrate by tuning the surface energies of the template and the substrate.

The deposition system 620 is a system that adds one or more thin films of materials on the substrate patterned by the patterning system 610. In some embodiments, the deposition system 620 adds a plurality of thin films of materials to form the stack with a gradient of refractive indices along any direction based on the differences between the refractive indices of two adjacent layers of materials. The deposition system 620 adds the thin films of materials on the substrate based on a physical vapor deposition, a chemical vapor deposition, an atomic layer deposition, a spin coating system, or some combination thereof, as described below in conjunction with FIG. 7.

In some configurations, the deposition system 620 deposits one or more thin films of spacer layers. The spacer layer performs some optical function (e.g., optical filter, polarizer, etc.). The spacer layer is composed of materials selected from a group consisting of: an organic polymer, a dielectric layer, or some combination thereof. For example, the deposition system 620 deposits one or more spacer layers of silicon di-oxide, SSQ derivatives, an organic polymer, titanium di-oxide, hafnium di-oxide, silicon nitride, some other material that performs an optical function, or some combination thereof.

The deposition system 620 may include an electron-beam evaporator, a magnetron sputter, a reactive sputter, a low pressure chemical vapor deposition (LPCVD) reactor, a plasma-enhanced chemical vapor deposition (PECVD) reactor, an atomic layer deposition (ALD) reactor, or some combination thereof. The electron-beam evaporator is based on a form of physical vapor deposition in which a target anode is bombarded with an electron beam given off by a charged tungsten filament under high vacuum. The electron beam causes atoms from the target to transform into the gaseous phase. The atoms from the target then precipitate into a solid form, coating everything in the vacuum chamber within line of sight with a thin layer of the anode material. The magnetron sputter uses a strong electric and magnetic fields to confine charged plasma particles close to the surface of the sputter target. In a magnetic field, electrons follow helical paths around magnetic field lines, undergoing more ionizing collisions with gaseous neutrals near the target surface than would otherwise occur. The reactive sputter is based on the sputtered particles undergoing a chemical reaction before coating the substrate. The chemical reaction that the particles undergo is with a reactive gas introduced into the sputtering chamber such as oxygen or nitrogen. The low pressure chemical vapor deposition (LPCVD) reactor is based on a chemical process at a pressure lower than the atmospheric pressure in which the substrate is exposed to one or more volatile precursors which react and/or decompose on the substrate surface to produce the desired deposit. The plasma-enhanced chemical vapor deposition (PECVD) is based on a chemical process that utilizes plasma to enhance the chemical reaction rates of the volatile precursors allowing deposition at lower temperatures. In some configurations, the deposition system 620 performs the deposition of organic coatings such as plasma polymers at a temperature relatively lower than the room temperature. The atomic layer deposition (ALD) reactor is based on a chemical process in which alternating monolayers of two elements are deposited onto a substrate by alternatively pulsing the chemical reactants in a reaction chamber and then chemisorbing in a saturated manner on the surface of the substrate, forming a chemisorbed monolayer. In some configurations, the deposition system 620 includes a controller (not shown here) that controls a number of cycles of pulsing the precursors into the reaction chamber, the deposition time for each pulsing, and the time for purging the reaction chamber after each pulsing.

The etching system 630 is a system that removes one or more thin films of materials deposited on the substrate patterned by the patterning system 610. The etching system 630 is based on a physical process, a chemical process, or some combination thereof. The etching system 630 selectively removes a first set of one or more thin films of materials at a different rate of removal when compared to a second set of one or more thin films of materials in a multi-layered stack of materials deposited on the substrate. The etching system 630 includes a wet bench, an ion milling module, a plasma based reactive ion etching module, a chemical mechanical polishing module, or some combination thereof. In a first configuration, the etching system 630 includes a wet bench which performs a chemical etching using a combination of acids, bases, and solvents at a range of temperatures and concentrations. In a second configuration, the etching system 630 includes an ion milling module that performs a physical removal of a portion of the thin films deposited on the substrate at an extremely low pressure and using a high accelerating potential in order to accelerate electrons impacting the neutral gas atoms with enough energy to ionize the gas atoms. In a third configuration, the etching system 630 includes a plasma based reactive ion etching (RIE) module based on a chemically reactive plasma at a low pressure and an external electromagnetic field to remove one or more thin films of material deposited on the substrate. In a fourth configuration, the etching system 630 includes a chemical mechanical polishing (CMP) module that performs smoothening of one or more thin films of materials based on a combination of chemical and mechanical forces. In some examples, the etching system 630 uses an abrasive and corrosive chemical slurry along with a polishing pad and retaining ring to perform the chemical mechanical polishing on one or more thin films deposited on the substrate patterned by the patterning system 610.

In some embodiments, the deposition system 620 adds one or more thin film of materials of a threshold value of thickness on the substrate patterned by the patterning system 610 which can be selectively removed by the etching system 630, as described below in conjunction with FIG. 7. For example, the deposition system 620 deposits a layer of thermally labile polymers such as poly(tert-butyl acrylate), tert-butoxy esters, which can be removed by the etching system 630 based on a thermal decomposition process at high temperatures to produce isobutylene (volatile by-product) and a carboxylic acid. In another example, the deposition system 620 deposits a layer of photolytically decomposable polymers such as triphenylsulfonium triflate, triphenyl sulfonium nonaflate, or 4-Isopropyl-4'-methyldiphenyliodonium Tetrakis(pentafluorophenyl)borate which can be removed by the etching system 630 based on a photolytic decomposition.

Figure 7:
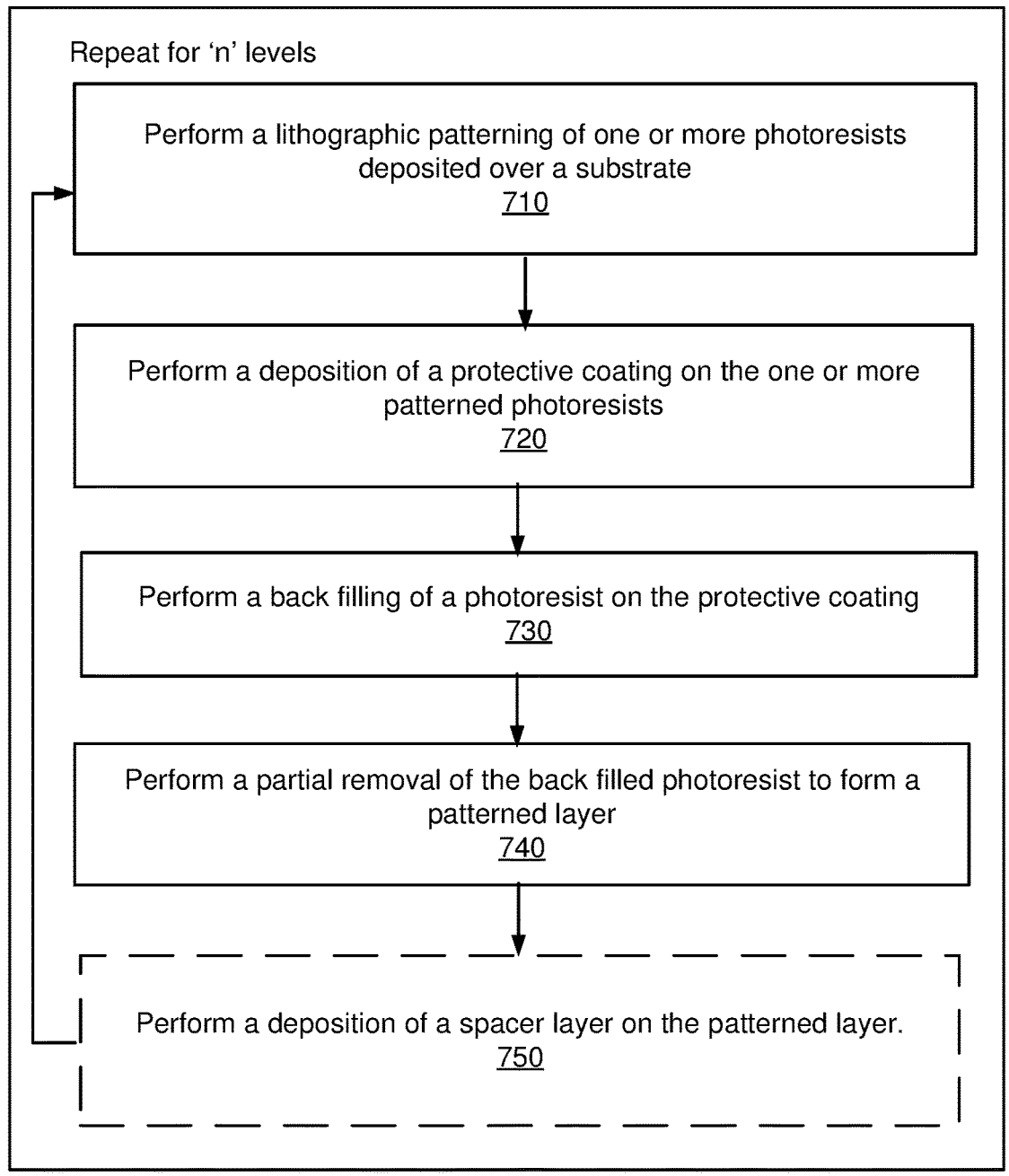
FIG. 7 is a flowchart illustrating the process of fabricating multilayer grating elements performed by the manufacturing system of FIG. 6, in accordance with one or more embodiments.

FIG. 7 is a flowchart illustrating the process 700 of fabricating multilayer grating elements performed by the manufacturing system 600 of FIG. 6, in accordance with one embodiment. Other entities may perform some or all of the steps of the process in other embodiments. Likewise, embodiments may include different and/or additional steps, or perform the steps in different orders.

The manufacturing system 600 (e.g., via the patterning system 610) performs 710 a lithographic patterning of one or more photoresists deposited on a substrate.

In one example, the patterning system 610 includes a convection oven for dehydration of the substrate at 150-200° C., a wafer spinner for coating the substance on the substrate, a mask aligner for defining the lithographic pattern on the substrate, and an exposure system for transferring the lithographic pattern in the mask to the substrate. In some embodiments, the manufacturing system 600 performs 710 a lithographic patterning of a hard mask deposited over the one or more photoresists prior to the lithographic patterning of the one or more photoresists to create a stack.

In some embodiments, the one or more photoresists include a first photoresist and a second photoresist. The first photoresist is of a first material type and the second photoresist is of a second material type. The first photoresist is deposited on the substrate, and the second photoresist is deposited on the first photoresist. In some embodiments, prior to depositing the second photoresist on the first photoresist the first photoresist is polished.

The manufacturing system 600 (e.g., via the deposition system 620) performs 720 a deposition of a protective coating on the one or more patterned photoresists. In some configurations, the manufacturing system 600 performs 720 a conformal deposition of the protective coating.

The manufacturing system 600 performs 730 a back filling of a photoresist on the protective coating. The photoresist being backfilled is of the second material type.

The manufacturing system 600 (e.g., via the etching system 630) performs 740 a partial removal of the back filled photoresist to form a patterned layer.

In some embodiments, as described below in detail with reference to FIG. 8B, the manufacturing system 600 performs 750 a deposition of one or more spacer layers on the patterned layer.

The manufacturing system 600 repeats the steps 710 to 750 described above to fabricate multilayer grating with a threshold number (n) of levels.

Figure 8A:
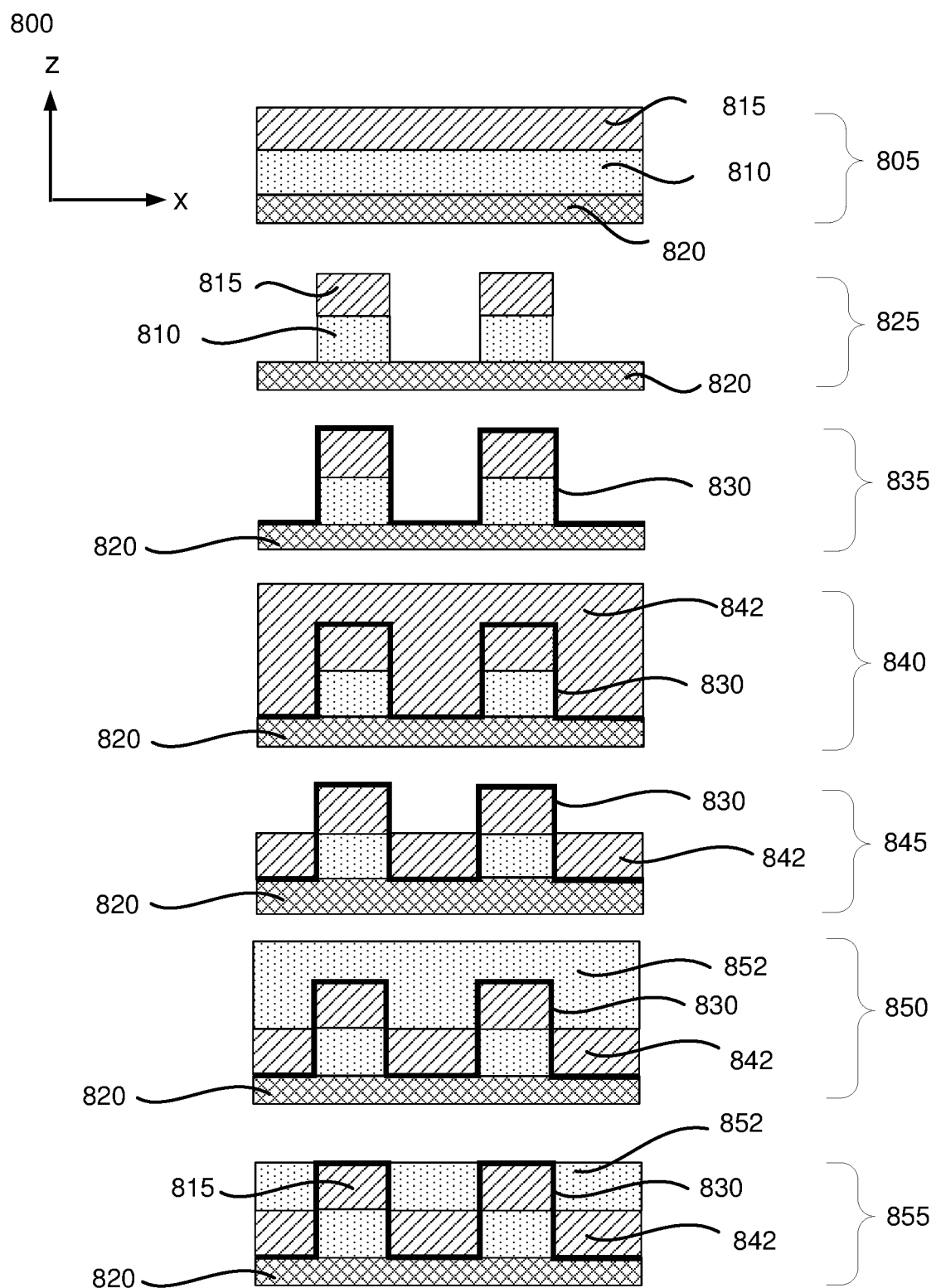
FIG. 8A illustrates a process of creating multilayer grating elements by the manufacturing system of FIG. 6, in accordance with one or more embodiments.

FIG. 8A is an illustration of a process 800 of creating multilayer grating elements by the manufacturing system 600 of FIG. 6, in accordance with one embodiment. The process 800 of FIG. 8A may be performed by the manufacturing system 600. Other entities may perform some or all of the steps of the process in other embodiments. Likewise, embodiments may include different and/or additional steps, or perform the steps in different orders.

The manufacturing system 600 performs 805 a deposition of a plurality of photoresists on a substrate. For example, the manufacturing system 600 performs a deposition of a first photoresist 810 on a waveguide 820 (i.e., the substrate). The waveguide 820 is an optical waveguide that outputs image light to an eye of a user, as described below in detail in conjunction with FIG. 10. The manufacturing system 600 performs a deposition of a second photoresist 815 over the first photoresist 810 to form the stack including two photoresists. The first photoresist and the second photoresist are composed of different materials (e.g., the first material 230 and the second material 240). The stack is a portion of a multilayer grating. Each of the first photoresist 810 and the second photoresist 815 in the stack is composed of an organic material such as an imprint resist, a shield resist, etc.

In the example of FIG. 8A, the first photoresist 810 is a SSQ derivative and the second photoresist 815 is a planarizing organic polymer such as transparent PMMA, PS, etc.

The manufacturing system 600 performs 825 a lithographic patterning of photoresists deposited on the waveguide 820. In one example, the patterning system 610 uses a single lithographic exposure to pattern the two photoresists. The etching system 630 selectively removes the lithographically exposed regions of the patterned photoresists. The etching may remove material to facilitate formation of any one of the multilayer gratings discussed above with reference to FIGS. 2-5.

The manufacturing system 600 performs 835 a deposition of a protective coating 830 in a conformal fashion on the patterned photoresists. For example, the deposition system 620 deposits one or more layers of dielectric materials, including, but not restricted to $HfO_2$, $TiO_2$, and $Si_3N_4$ which cannot be removed by the etching system 630. In some configurations, the deposition system 620 deposits the protective coating 830 based on an atomic layer deposition (ALD) process to achieve a threshold value of thickness for each layer of the protective coating 830.

The manufacturing system 600 performs 840 a deposition of a photoresist 842 on the protective coating 830. The photoresist 842 has the same index profile as the second photoresist 815, and may be composed of the same materials as the second photoresist 815. In some configurations, the deposition system 620 performs 840 a back-filling of the photoresist 842 on the protective coating 830.

The manufacturing system 600 performs 845 a selective removal of the back-filled photoresist 842. In some configurations, the etching system 630 performs 845 the selective removal of the back-filled photoresist 842 to bring the difference between the thickness of the back-filled photoresist 842 and the thickness of the first photoresist 810 to a threshold value closer to zero. In alternate configurations, the etching system 630 performs 845 the selective removal of the back-filled photoresist 842 such that the thickness of the back-filled photoresist 842 is relatively larger than the thickness of the first photoresist 810 by a threshold value.

The manufacturing system 600 performs 850 a deposition of a photoresist 852 on the protective coating 830. The photoresist 852 has the same index profile as the first photoresist 810, and may be composed of the same materials as the first photoresist 810. In some configurations, the deposition system 620 performs 850 a back-filling of the photoresist 852 on the protective coating 830 such that the thickness of the back-filled photoresist 852 is relatively larger than the thickness of the second photoresist 815 by a threshold value.

The manufacturing system 600 performs 855 a selective removal of the back-filled photoresist 852. In some configurations, the etching system 630 performs 855 the selective removal of the back-filled photoresist 852 until the top surface of the protective coating 830 gets exposed.

The multilayer grating may be used in, e.g., a waveguide as discussed above with reference to FIG. 1. In the example of FIG. 8A, the portion of the multilayer grating formed includes a first patterned layer composed of a plurality of alternating instances of the first photoresist 810 and the back-filled photoresist 842 along the x-dimension, and a second patterned layer composed of a plurality of alternating instances of the first photoresist 810 and the back-filled photoresist 842 along the x-dimension, and each instance of the first photoresist 810 in the second patterned layer is aligned with a corresponding instance of the back-filled photoresist 842 in the first patterned layer, and each instance of the back-filled photoresist 842 in the second patterned layer is aligned with a corresponding instance of the first photoresist 810 in the first patterned layer. Accordingly, there is a periodic pattern similar to the periodic pattern in the multilayer gratings discussed above (e.g., FIG. 2, 3A, etc.). Each patterned layer has the same periodic pattern as an adjacent periodic pattern but offset by Tx/2 in the x dimension (and Ty/2 in the y dimension). Accordingly, there is a relationship between index profiles of adjacent patterned layers. Each patterned layer has an index profile (in x and y) that is identical to, but inverted relative to the index profiles of adjacent patterned layers. This relationship in adjacent index profiles allows for one or more non-zero diffraction orders produced by different patterned layers to destructively interfere with each other, thereby mitigating the rainbow effect.

In the example of FIG. 8A, the stack including two photoresists is an array of one dimensional multilayer grating element. In alternate embodiments, the stack including two photoresists can be scaled to form a two dimensional array of multilayer grating elements.

Figure 8B:
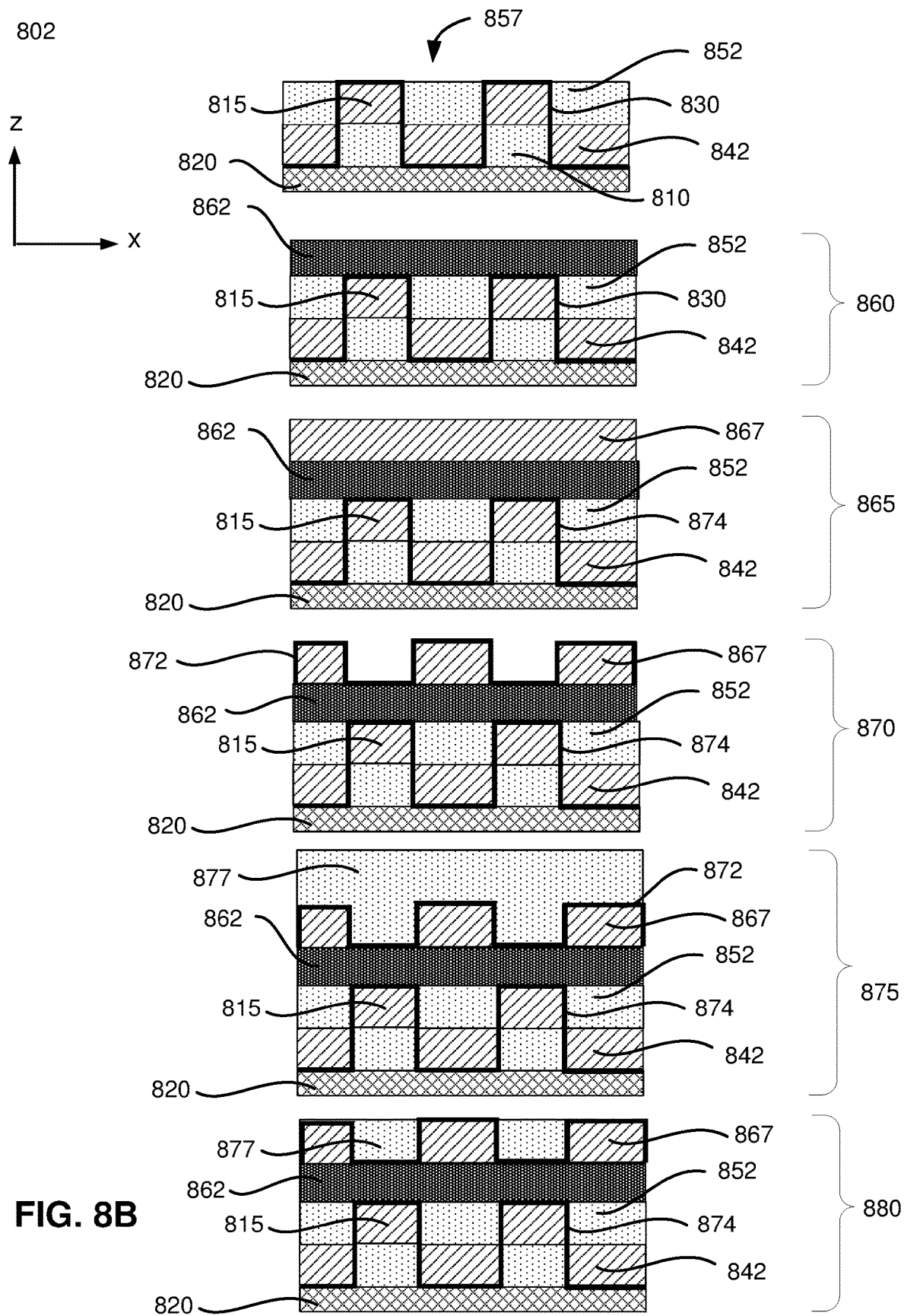
FIG. 8B illustrates a process of creating multilayer grating elements with one or more spacer layers by the manufacturing system of FIG. 6, in accordance with one or more embodiments.

FIG. 8B illustrates a process 802 of creating multilayer grating elements with one or more spacer layers by the manufacturing system 600 of FIG. 6, in accordance with one embodiment. The process 802 of FIG. 8B may be performed by the manufacturing system 600. Other entities may perform some or all of the steps of the process in other embodiments. Likewise, embodiments may include different and/or additional steps, or perform the steps in different orders. The process 802 of FIG. 8B is substantially similar to the process 800 of FIG. 8A except for the presence of one or more spacer layers.

As described above with reference to FIG. 8A, the manufacturing system 600 forms a portion 857 of a multilayer grating from the stack created over the waveguide 820. The portion 857 of the multilayer grating includes the first photoresist 810, the second photoresist 815, the waveguide 820, the protective coating 830, the photoresist 842, and the back-filled photoresist 852.

The manufacturing system 600 performs 860 a deposition of a spacer layer 862 on the portion 857 of the multilayer grating. The spacer layer 862 is an optical filter that receives light and transmits a portion of the incident light. The spacer layer 862 is composed of materials selected from a group consisting of: an organic polymer, a dielectric layer, or some combination thereof. In some configurations, the deposition system 620 deposits one or more spacer layers composed of materials including, but not restricted to, silicon di-oxide, SSQ derivatives, an organic polymer, titanium di-oxide, hafnium di-oxide, silicon nitride, or some combination thereof.

The manufacturing system 600 performs 865 a deposition of a third photoresist 867 over the spacer layer 862. The photoresist 867 has the same index profile as the second photoresist 815 and the photoresist 842, and may be composed of the same materials as the second photoresist 815 and/or the photoresist 842. The third photoresist 867 is composed of an organic material such as an imprint resist, a shield resist, etc. In the example of FIG. 8B, the third photoresist 867 is a SSQ derivative.

The manufacturing system 600 performs 870 a lithographic patterning of the third photoresist 867 deposited on the spacer layer 862. In one example, the patterning system 610 uses a single lithographic exposure to pattern the third photoresist 867. The etching system 630 selectively removes the lithographically exposed regions of the patterned photoresist. The manufacturing system 600 performs 870 a deposition of a protective coating 874 in a conformal fashion on the patterned photoresists. The protective coating 874 is an embodiment of the protective coating 830, described above with reference to FIG. 8A.

The manufacturing system 600 performs 875 a deposition of a photoresist 877 on the protective coating 874. The photoresist 877 has the same index profile as the backfilled photoresist 852 and the first photoresist 810, and may be composed of the same materials as the backfilled photoresist 852 and the first photoresist 810.

The manufacturing system 600 performs 880 a selective removal of the photoresist 877. In some configurations, the etching system 630 performs 880 the selective removal of the photoresist 877 to bring the difference between the thickness of the photoresist 877 and the thickness of the third photoresist 867 to a threshold value closer to zero. In alternate configurations, the etching system 630 performs 880 the selective removal of the photoresist 877 such that the thickness of the photoresist 877 is relatively larger than the thickness of the third photoresist 867 by a threshold value.

The process 802 forms a portion of a multilayer grating that includes at least one spacer layer 862. The multilayer grating may be used in, e.g., a waveguide as discussed above with reference to FIG. 1. In the example of FIG. 8B, the stack including the third photoresist 867 and the photoresist 877 is an array of one dimensional multilayer grating element. In alternate embodiments, the stack including two photoresists can be scaled to form a two dimensional array of multilayer grating elements.

Figure 9:
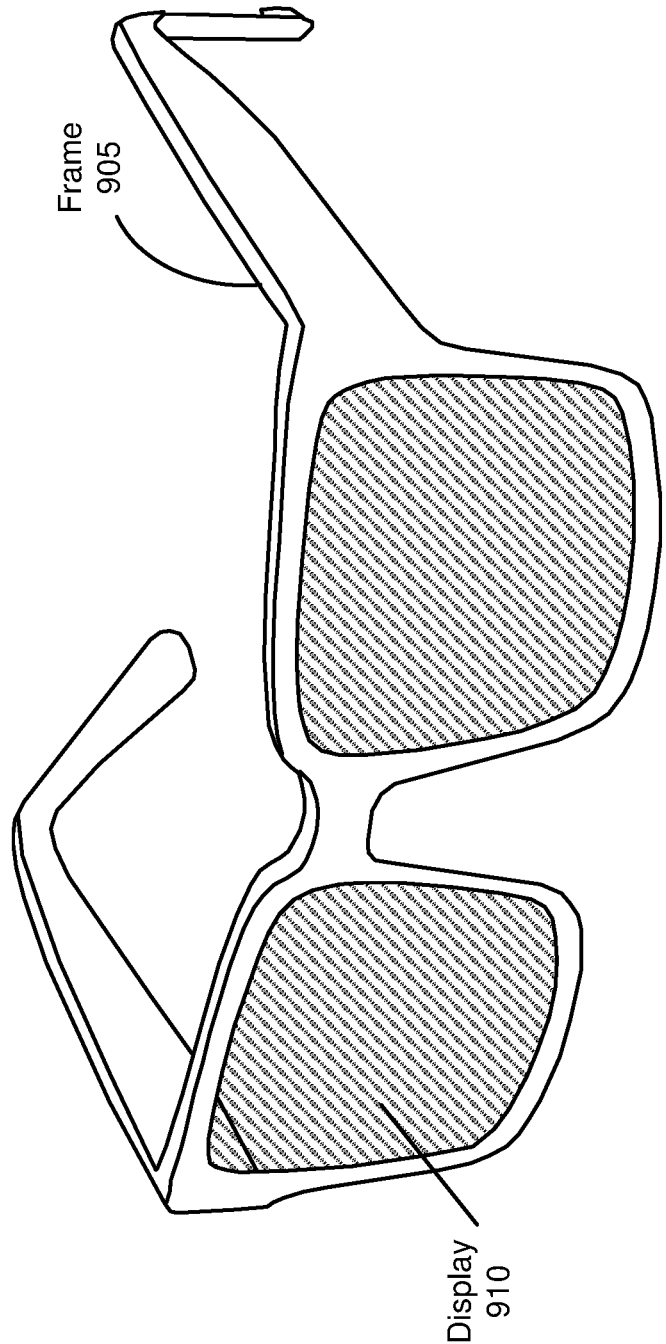
FIG. 9 is a diagram of a near-eye-display (NED) with multilayer grating, in accordance with one or more embodiments.

FIG. 9 is a diagram of a near-eye-display (NED) 900 with multilayer grating fabricated using the manufacturing system of FIG. 1, in accordance with an embodiment. The NED may also be referred to as a Head-Mounted-Display (HMD). The NED includes one or more displays 910 that include multilayer grating fabricated using the manufacturing system 600, in accordance with an embodiment. The NED 900 presents media to a user. Examples of media presented by the NED 900 include one or more images, video, audio, or some combination thereof. In some embodiments, audio is presented via an external device (e.g., speakers and/or headphones) that receives audio information from the NED 900, a console (not shown), or both, and presents audio data based on the audio information. The NED 900 is generally configured to operate as an artificial reality NED. In some embodiments, the NED 900 may augment views of a physical, real-world environment with computer-generated elements (e.g., images, video, sound, etc.).

The NED 900 shown in FIG. 9 includes a frame 905 and a display 910. The frame 805 includes one or more optical elements which together display media to users. The display 910 is configured for users to see the content presented by the NED 900. As discussed below in conjunction with FIG. 10, the display 910 includes at least one waveguide display.

Figure 10:
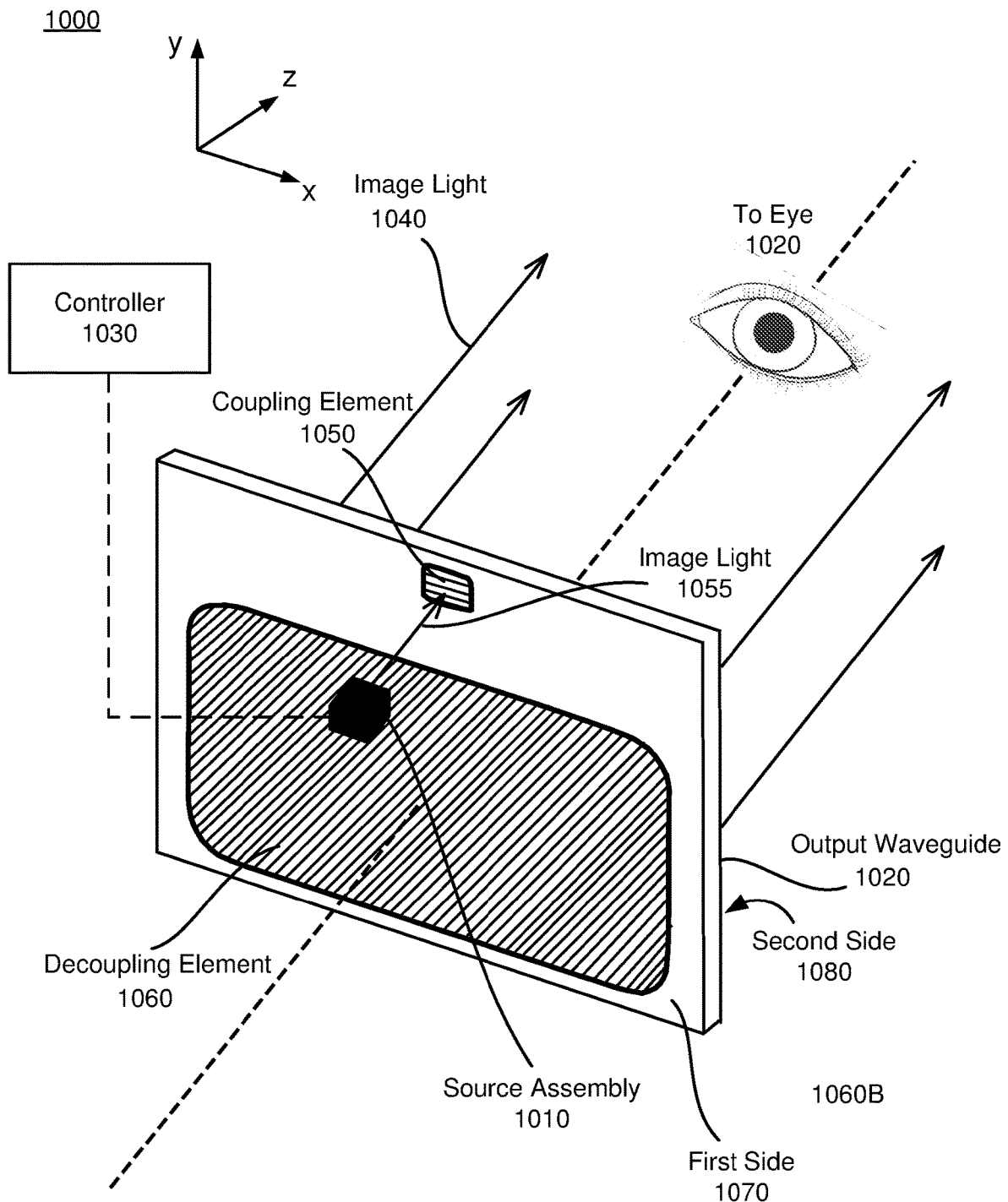
FIG. 10 illustrates an isometric view of a waveguide display, in accordance with an embodiment.

FIG. 10 illustrates an isometric view of a waveguide display 1000, in accordance with one or more embodiments. In some embodiments, the waveguide display 1000 (may also be referred to as a scanning waveguide display) is a component of the NED 900. In alternate embodiments, the waveguide display 1000 is part of some other NED, or other system that directs display image light to a particular location.

The waveguide display 1000 includes a source assembly 1010, and an output waveguide 1020. The source assembly 1010 generates an image light. The source assembly 1010 includes a source array and an optics system (not shown here). The source assembly 1010 generates and outputs an image light 1055 to a coupling element 1050 of the output waveguide 1020.

The output waveguide 1020 is an optical waveguide that outputs image light to an eye 1045 of a user. In some embodiments, the output waveguide 1020 is an isotropic view of the waveguide 105 discussed above with reference to FIG. 1. The output waveguide 1020 receives the image light 1055 at one or more coupling elements 1050, and guides the received input image light to one or more decoupling elements 1060. In some embodiments, the coupling element 1050 couples the image light 1055 from the source assembly 1010 into the output waveguide 1020. The coupling element 1050 may be, e.g., a diffraction grating, a holographic grating, a multilayer grating (e.g., as discussed above with reference to FIGS. 1-8B) some other element that couples the image light 1055 into the output waveguide 1020, or some combination thereof. In embodiments where the coupling element 1050 is a type of diffraction grating, the pitch of the diffraction grating is chosen such that total internal reflection occurs, and the image light 1055 propagates internally toward the decoupling element 1060. For example, the pitch of the diffraction grating may be in the range of 300 nm to 600 nm.

The decoupling element 1060 decouples the total internally reflected image light from the output waveguide 1020. The decoupling element 1060 is a multilayer grating (e.g., as discussed above with reference to FIGS. 1-8B) that decouples the image light 1040 out of the output waveguide 1020. A pitch of the multilayer grating is chosen to cause incident image light to exit the output waveguide 1020. For example, the pitch of the diffraction grating may be in the range of 300 nm to 600 nm. The manufacturing system 600 performs a self-aligned stack process to fabricate multilayer grating as described above in conjunction with FIGS. 6-8B. As discussed above with reference to FIGS. 1-5, the inverted index profiles of the multilayer grating, cause higher order rays to destructively interfere with each other and accordingly mitigate the rainbow effect.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A waveguide comprising:
a waveguide body configured to expand received image light in at least one dimension as light propagates within the waveguide body;
an input grating configured to incouple image light into the waveguide body; and
a multilayer grating comprising a plurality of structures separated from each other by at least a threshold distance, each of the plurality of structures including a first material and a second material, the plurality of structures forming a 2-dimensional grating including a plurality of layers, the plurality of layers including at least a first patterned layer and a second patterned layer, the first patterned layer including the first material and the second material of the plurality of structures arranged in a first pattern such that the first patterned layer has a first index profile, and the second patterned layer including the first material and the second material of the plurality of structures arranged in a second pattern such that the second patterned layer has a second index profile that is inverted relative to the first index profile, and the multilayer grating is configured to output a first portion of the expanded image light to an eyebox,
wherein ambient light incident on the first patterned layer and the second patterned layer creates a first diffracted ray and a second diffracted ray, respectively, and the first diffracted ray and the second diffracted ray destructively interfere with each other based in part on the inverted index profile.

2. The waveguide of claim 1, wherein:
the first patterned layer is composed of a plurality of alternating instances of the first material and the second material in a first dimension; and
the second patterned layer is composed of a plurality of alternating instances of the first material and the second material in the first dimension, and each instance of the first material in the second patterned layer is aligned with a corresponding instance of the second material in the first patterned layer, and each instance of the second material in the second patterned layer is aligned with a corresponding instance of the first material in the first patterned layer.

3. The waveguide of claim 1, wherein each structure of the plurality of structures has a shape selected from a group consisting of: a column with a circular cross section, a rectangular column with a circular cross section, and spherical.

4. The waveguide of claim 1, wherein:
the first patterned layer is composed of a plurality of alternating instances of the first material and the second material in a first dimension and a second dimension orthogonal to the first dimension; and
the second patterned layer is composed of a plurality of alternating instances of the first material and the second material in the first dimension and the second dimension, and each instance of the first material in the second patterned layer is aligned with a corresponding instance of the second material in the first patterned layer, and each instance of the second material in the second patterned layer is aligned with a corresponding instance of the first material in the first patterned layer.

5. The waveguide of claim 1, wherein the multilayer grating further includes at least one spacer layer.

6. The waveguide of claim 5, wherein the spacer layer is an optical filter.

7. The waveguide of claim 1, wherein the multilayer grating has non-orthogonal grating vectors.

8. The waveguide of claim 1, wherein the first diffracted ray and the second diffracted ray correspond to a first negative diffraction order.

9. The waveguide of claim 1, wherein the waveguide is a component of a near-eye display.

10. A near-eye display (NED) comprising:
a light source assembly configured to emit an image light that is at least partially coherent;
an output waveguide comprising:
a waveguide body configured to expand the image light in at least one dimension,
an input grating configured to incouple the image light into the waveguide body, and
a multilayer grating comprising a plurality of structures separated from each other by at least a threshold distance, each of the plurality of structures including a first material and a second material, the plurality of structures forming a 2-dimensional grating including a plurality of layers, the plurality of layers including at least a first patterned layer and a second patterned layer, the first patterned layer including the first material and the second material of the plurality of structures arranged in a first pattern such that the first patterned layer has a first index profile, and the second patterned layer including the first material and the second material of the plurality of structures arranged in a second pattern such that the second patterned layer has a second index profile that is inverted relative to the first index profile, and the multilayer grating is configured to output a first portion of the expanded image light to an eyebox,
wherein ambient light incident on the first patterned layer and the second patterned layer creates a first diffracted ray and a second diffracted ray, respectively, and the first diffracted ray and the second diffracted ray destructively interfere with each other based in part on the inverted index profile.

11. The NED of claim 10, wherein:
the first patterned layer is composed of a plurality of alternating instances of the first material and the second material in a first dimension and a second dimension orthogonal to the first dimension; and
the second patterned layer is composed of a plurality of alternating instances of the first material and the second material in the first dimension and the second dimension, and each instance of the first material in the second patterned layer is aligned with a corresponding instance of the second material in the first patterned layer, and each instance of the second material in the second patterned layer is aligned with a corresponding instance of the first material in the first patterned layer.

12. The NED of claim 10, wherein each structure of the plurality of structures has a shape selected from a group consisting of: a column with a circular cross section, a rectangular column with a circular cross section, and spherical.

13. The NED of claim 10, wherein the multilayer grating further includes at least one spacer layer.

14. The NED of claim 13, wherein the spacer layer is an optical filter.

15. The NED of claim 10, wherein the multilayer grating has non-orthogonal grating vectors.

16. The NED of claim 10, wherein the first diffracted ray and the second diffracted ray correspond a first negative diffraction order.

17. The NED of claim 10, wherein the input grating is composed of a third layer and a fourth layer, the third layer including a plurality of different materials that are arranged in a third pattern such that the third layer has a third index profile, and the fourth layer including a plurality of different materials that are arranged in a fourth pattern such that the fourth layer has a fourth index profile that is inverted relative to the third index profile.

18. The NED of claim 17, wherein:
the third layer is composed of a plurality of alternating instances of a third material and a fourth material in a first dimension; and
the fourth layer is composed of a plurality of alternating instances of the third material and the fourth material in the first dimension, and each instance of the first material in the second patterned layer is aligned with a corresponding instance of the second material in the first patterned layer, and each instance of the second material in the second patterned layer is aligned with a corresponding instance of the first material in the first patterned layer.

* * * * *